UNITED STATES PATENT OFFICE.

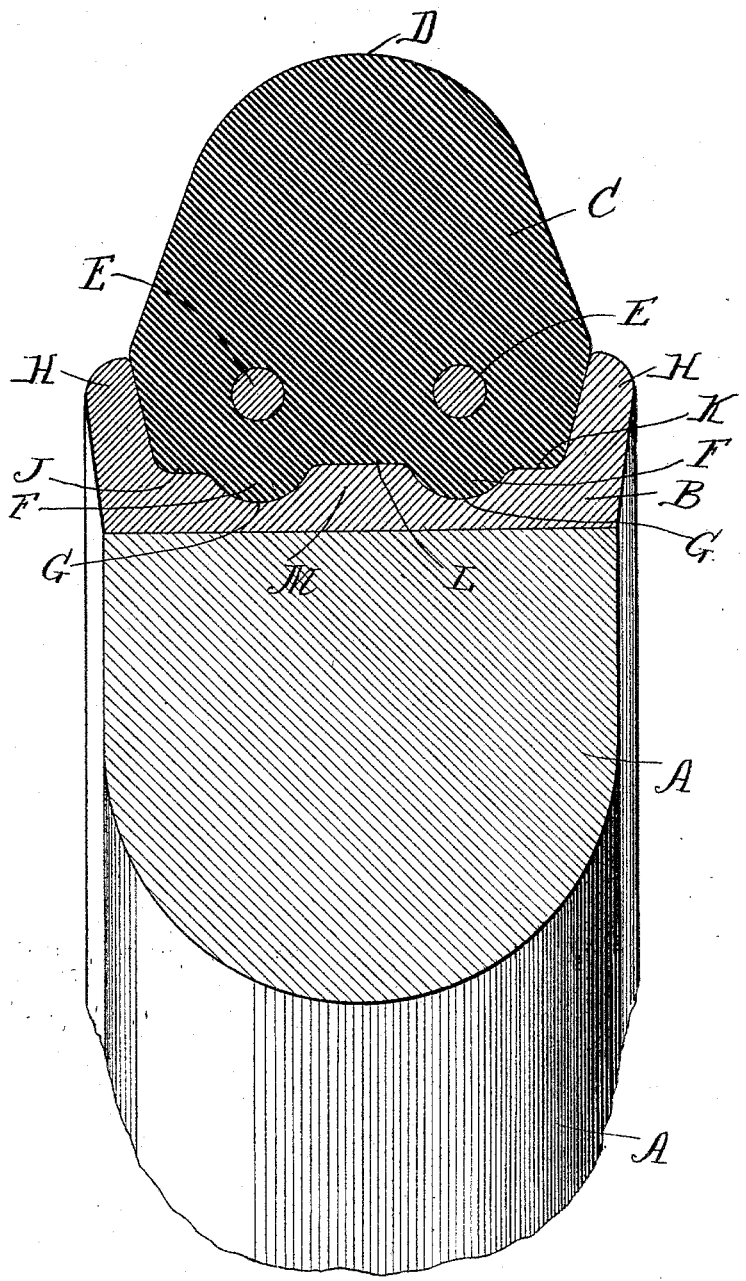

JOHN P. KUNKLE, OF CHICAGO, ILLINOIS.

CUSHION-TIRE.

SPECIFICATION forming part of Letters Patent No. 602,907, dated April 26, 1898.

Application filed November 8, 1897. Serial No. 657,782. (No model.)

*To all whom it may concern:*

Be it known that I, JOHN P. KUNKLE, a citizen of the United States, residing at Chicago, in the county of Cook and State of Illinois, have invented a new and useful Cushion-Tire for Wheels, of which the following is a specification.

This invention relates to cushion-tires for wheels.

The object of the invention is to provide means for securing cushion or rubber tires to the wheel rim or felly.

A further object of the invention is to provide means whereby the binding-wires do not cut through the tire.

The invention consists, substantially, in the construction, combination, location, and relative arrangement, all as will be more fully hereinafter set forth, as shown in the accompanying drawing and finally specifically pointed out in the appended claims.

The single view of the drawing represents a transverse section through the tire, the rim, and the felly.

In the drawing reference-sign A designates the felly of the wheel, B the rim or plate for receiving the tire and which may be mounted on and secured to the wheel-felly A in any suitable and convenient manner, and C designates the tire. This tire is preferably made or formed solid, of rubber or other suitable resilient material, rubber being preferred. The tire may be of any suitable or convenient shape in cross-sectional area. Preferably, and as shown, the tread portion or surface D of the tire is rounding or convex. The tire is provided with longitudinally-arranged holes or openings to receive wires E, by which the tire is held and bound to the rim or plate B. Heretofore the tire has been provided with a flat base or surface and which rests upon a flat upper surface of the plate or rim B. This has been found objectionable in practice for the reason that the pressure exerted upon the tread of the tire when resting on the ground by the weight of the carriage or other vehicle supported by the wheels has caused the binding-wires E to cut through the tires, thereby rapidly destroying the same. This objection is particularly present where the tire rests upon a solid flat surface of the rim or plate B.

Various expedients have been resorted to in order to overcome the objections noted. For instance, it has been proposed to avoid the use of binding-wires entirely and to form the body of rim or plate B hollow, with openings through the top or supporting surface thereof through which the material of the tire may be forced under the heavy pressure to which it is subjected. This, however, has been found objectionable for the reason that without binding-wires the tire cannot be efficiently held to its seat in the rim or plate B, and the danger is incurred of twisting the tire entirely out of its seat, particularly when turning corners or when stones or other obstructions are encountered by the sides of the tire. It has also been endeavored to avoid the objections noted by providing an interlaced or spiral binding-wire in addition to the usual binding-wires, the object being to form a support for the binding-wire. This, however, does not remedy the defect, because the interlaced or spiral wire cuts through and destroys the tire the same as the old form of binding-wire, and indeed more rapidly than the binding-wire, because the interlaced wire necessarily is in closer proximity to the supporting-surface of the plate or rim B, and besides offers greater opportunity for cutting through the sides of the tire as well as the bottom or base thereof. Therefore instead of such construction being an improvement it is less effective for the purposes desired, and, moreover, adds to the cost. It has also been proposed to form a hollow opening through the longitudinal center of the tire and locate the binding-wires therein, such opening being so shaped as to form side corners or pockets to receive the binding-wires. Such construction, however, not only does not remedy the defects above noted, but adds to the objection, for the reason that the lateral strains produced in turning corners or when stones or other obstructions are encountered on the sides of the tire cause unequal tension in the binding-wires, and hence cause said wires to work back and forth in the opening or chamber formed in the tire to receive them, thus rapidly wearing and cutting through the tire. Moreover, the pressure exerted on the tread of the tire causes the tire to be compressed to such an extent as to close the central opening or chamber therein, thereby forming folds or creases through the portion of the tire constituting the side walls of said chamber, which weaken and soon destroy the tire along the line of such folds. In the present invention, however, all these objections and defects are wholly avoided in the following manner: I form the tire with a generally flat or under surface, whereby any tendency of the tire to twist out of its seat in turning curves or corners or encountering stones or other obstructions on the sides thereof is resisted. In casting or molding the tire I make provision for forming longitudinal ribs or projections F F on the under surface thereof. These ribs or projections are arranged directly in line with the binding-wires E, and their object is to provide additional material in the tire at that point in the base thereof where exists the greatest danger of the binding-wires cutting through against the supporting-surface of the rim or plate B. In order to accommodate the ribs or projections F, I provide in the supporting-surface of such rim or plate corresponding seats or depressions, (indicated at G.) In practice I prefer to employ two binding-wires E, and hence I form two ribs or projections F on the tire-base and two depressions or seats G in rim B. The binding-wires E are located in tire C on opposite sides of the vertical central line thereof, as shown, and should not be above the top edges of the flanges H of the rim B. By this arrangement it will be seen that the base of the tire C is composed of the flat surfaces J K at each edge thereof and the flat surface L between the ribs F, thus insuring an efficient support for the tire, whereby strains tending to twist the same out of its seat are resisted. It will also be seen that at the point where the greatest danger of the wires cutting through the tire occurs an increased thickness of tire is provided which resists any tendency of the wire cutting through. The supporting-surface of rim B is formed to correspond with the base surface of the tire—that is, the surface of said rim is provided with seats or depressions G to receive ribs F and with flat portions to receive the flat portions J K L of the tire. In order to still further provide against danger of the binding-wires E cutting through the tire, and hence to prolong the life of the cushion at least until the tread of the tire wears out, I arrange that portion of the surface of rim B which receives the flat portion L of tire-base between the ribs F F to project slightly above the top surfaces which support the edge portions J K of the tire-base. From this construction it will be seen that the greatest pressure exerted on the tire is received upon the flat surface of central projection M of the rim B, and hence at a point out of alinement with the binding-wires. In other words, that portion of the tire directly beneath the wires is relieved to a large extent of the pressure that would otherwise be imposed thereon, the greater portion of the pressure being taken on the surface of projection M of the rim, and hence danger of the wire cutting through the tire is still further reduced and guarded against. It will also be seen that each binding-wire is separately embedded in the tire, and hence is solidly supported or inclosed, and therefore whatever may be the variation in the strains to which said wires are subjected there is no lateral play, and hence no opportunity to wear or cut through the tire.

Having now set forth the object and nature of my invention and a construction embodying the same, what I claim as new and useful and of my own invention, and desire to secure by Letters Patent of the United States, is—

1. A solid-cushion tire for vehicle-wheels having a flat base, with longitudinal ribs or projections formed therein, and a supporting-rim having side flanges arranged to support the tire against lateral displacement and having flat supporting-surfaces to receive the flat bearing-surfaces of said tire-base, and seats to receive said ribs or projections, in combination with binding-wires embedded longitudinally in said tire and located above the flat portions of the tire-base but in line with said ribs or projections, as and for the purpose set forth.

2. A solid-rubber tire having longitudinally-arranged binding-wires embedded therein, and having a flat base with longitudinal ribs or projections formed therein at points directly opposite said binding-wires, said binding-wires located above the flat surfaces or portions of the tire-base, a flat portion of such base being interposed between said ribs, in combination with a supporting rim or plate having flat portions and seats or depressions to receive the flat portions and ribs of said tire, the surface of said plate or rim located between the seats formed therein being slightly higher than the other portions of said surface, as and for the purpose set forth.

In witness whereof I have hereunto set my hand, this 6th day of November, 1897, in the presence of the subscribing witnesses.

JOHN P. KUNKLE.

Witnesses:
E. N. ROUNDY,
S. E. DARBY.